(12) United States Patent
Kale et al.

(10) Patent No.: US 7,996,019 B2
(45) Date of Patent: Aug. 9, 2011

(54) INTELLIGENT LOCATION-BASED SERVICES

(75) Inventors: Kaustubh Kale, Sunrise, FL (US); Dominik Buszko, Weston, FL (US)

(73) Assignee: Motorola Mobilty, Inc., Libertyville, IL (US)

( * ) Notice: Subject to any disclaimer, the term of this patent is extended or adjusted under 35 U.S.C. 154(b) by 884 days.

(21) Appl. No.: 11/616,111

(22) Filed: Dec. 26, 2006

(65) Prior Publication Data

US 2008/0153512 A1    Jun. 26, 2008

(51) Int. Cl.
*H04W 24/00* (2009.01)
(52) U.S. Cl. .................. 455/456.3; 455/456.1; 455/414
(58) Field of Classification Search ............... 455/456.3, 455/456.1, 414; 707/10
See application file for complete search history.

(56) References Cited

U.S. PATENT DOCUMENTS

| | | | |
|---|---|---|---|
| 6,401,085 B1 | 6/2002 | Gershman et al. | |
| 6,795,768 B2 | 9/2004 | Bragansa et al. | |
| 6,970,871 B1 * | 11/2005 | Rayburn | 707/10 |
| 6,978,206 B1 | 12/2005 | Pu et al. | |
| 7,031,875 B2 | 4/2006 | Ellenby et al. | |
| 7,072,665 B1 * | 7/2006 | Blumberg et al. | 455/456.1 |
| 2002/0164998 A1 | 11/2002 | Younis | |
| 2003/0182394 A1 | 9/2003 | Ryngler et al. | |
| 2004/0198386 A1 | 10/2004 | Dupray et al. | |
| 2004/0266456 A1 | 12/2004 | Bostrom et al. | |
| 2006/0036642 A1 | 2/2006 | Horvitz et al. | |
| 2006/0069749 A1 | 3/2006 | Herz et al. | |
| 2006/0080321 A1 | 4/2006 | Horn et al. | |
| 2006/0121913 A1 | 6/2006 | Lin et al. | |
| 2006/0212878 A1 | 9/2006 | Park et al. | |
| 2007/0005363 A1 * | 1/2007 | Cucerzan et al. | 704/256 |
| 2008/0032703 A1 * | 2/2008 | Krumm et al. | 455/456.1 |

FOREIGN PATENT DOCUMENTS

| | | |
|---|---|---|
| EP | 1517155 A2 | 3/2005 |
| WO | WO0217567 A2 | 2/2002 |
| WO | WO03014978 A2 | 2/2003 |

OTHER PUBLICATIONS

Jason Fry, Dreams of a Truly Mobile Web, The Wall Street Journal, http://www.geovector.com/press/WSJ070306.html, Jul. 3, 2006, 2 pgs.
Pashtan, et al., Aware Networks, Northwestern University, Personal Service Areas for Mobile Web Applications, http://www.ece.northwestern.edu/~peters/references/personal_serv_areas_IEEE-IC.pdf, Nov.-Dec. 2004, 7 pgs.
Telenav.com, Throw your bulky maps away-With TeleNav GPS Navigator, you will never need to print out directions again, http://www.telenav.com/products/tn/features.html#b, Accessed Dec. 19, 2006, 2 pgs.

* cited by examiner

*Primary Examiner* — David Q Nguyen (57) ABSTRACT

A method (500) for dynamically providing location-based services based, at least in part, on time (114), current detected information (116, 118), historical information (124, 126), contextual information (128), user preferences (120, 130) and/or a user input (122).

16 Claims, 5 Drawing Sheets

FIG. 6

INTELLIGENT LOCATION-BASED SERVICES

BACKGROUND OF THE INVENTION

1. Field of the Invention

The present invention generally relates to mobile stations and, more particularly, to mobile stations which identify points of interest.

2. Background of the Invention

Location-based services (LBS) are offered by some mobile communications networks as a way to send custom advertising and other information to a mobile station subscriber based on the subscriber's current location. To implement location-based services, a communications service provider typically receives location information for the subscriber's mobile station. The location information can be, for instance, location information that is generated by a global positioning satellite (GPS) receiver that is built into the mobile station, or location information estimated by performing radiolocation and tri-lateration on communication signals received from the mobile station by a plurality of geographically disperse communication antennas.

One example of a location-based service is a service that identifies to the user a nearest business of a certain type. For example, the user can query the location-based service for a list of Italian restaurants within a five mile radius, or perhaps request information only on the nearest Italian restaurant. In response, the location-based service can provide the requested information, and such information can be presented on the user's mobile station.

Although there certainly is a benefit provided to the user by using location-based services, the user still is required to identify specific parameters to be processed by a location-based service before desired information can be provided. Taking the time to specify such parameters can be inconvenient to a user.

SUMMARY OF THE INVENTION

The present invention relates to a method for dynamically providing location-based services. The method can include automatically identifying at least one user pattern of a user and storing historical information that corresponds to the user pattern. The method also can include processing the historical information to retrieve location-based service information that corresponds to the identified user pattern in response to detecting at least one parameter that corresponds to the historical information.

Identifying the user pattern can include identifying a location visited by the user at a particular time. Further, detecting the parameter that corresponds to the historical information can include detecting that the user is at the identified location. Identifying the user pattern also can include identifying a location visited by the user more than once at a particular time of day, on a particular day of a week, on a particular day of a month, or on a particular day of a year. In such an arrangement, detecting the parameter that corresponds to the historical information can include detecting the particular time of day, the particular day of the week, the particular day of the month, or the particular day of the year.

Identifying the user pattern also can include identifying a motion parameter associated with the user. In this arrangement, detecting the parameter that corresponds to the historical information can include detecting the motion parameter associated with the user. Identifying the user pattern further can include identifying a particular mode of transportation used by the user. Detecting the parameter that corresponds to the historical information can include detecting that the user is using the particular mode of transportation. Further, identifying the user pattern can include identifying a particular route traveled by the user, and detecting the parameter that corresponds to the historical information can include detecting that the user is traveling along the particular route. The method also can include processing at least one user preference to retrieve the location-based service information that corresponds to the identified user pattern.

The present invention also relates to a method for dynamically providing location-based services. The method can include receiving at least one user input indicating a request for a suggested point of interest, generating a query based on the user input and a time reference, processing the generated query to identify a plurality of points of interest, and presenting the points of interest to a user. The method further can include identifying a particular mode of transportation used by the user. In such an arrangement, generating the query can be further based on the particular mode of transportation. The method also can include identifying a particular route traveled by the user, and generating the query can be further based on the particular route.

The present invention also relates to a system that dynamically provides location-based services. The system can include a controller that automatically identifies at least one user pattern of a user, stores historical information that corresponds to the user pattern, and processes the historical information to retrieve location-based service information that corresponds to the identified user pattern in response to detecting at least one parameter that corresponds to the historical information. The controller can identify the user pattern by identifying a location visited by the user at a particular time. The controller can detect the parameter that corresponds to the historical information by detecting that the user is at the identified location.

The controller also can identify the user pattern by identifying a location visited by the user more than once at a particular time of day, on a particular day of a week, on a particular day of a month, or on a particular day of a year. In such an arrangement, the controller can detect the parameter that corresponds to the historical information by detecting the particular time of day, the particular day of the week, the particular day of the month, or the particular day of the year.

The controller also can identify the user pattern by identifying a motion parameter associated with the user. The controller can detect the parameter that corresponds to the historical information by detecting the motion parameter associated with the user. The controller also can identify the user pattern by identifying a particular mode of transportation used by the user.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method and a system that dynamically provides location-based services (LBS). For example, assume that on past occasions when a user has traveled along a particular highway at a certain time of day, the user has stopped at a particular type of location, for instance at fast food restaurants. The system can store information relevant to this user pattern as historical information. When the system detects that the user is again traveling along that highway at approximately the same time of day, the system can process the historical information, along with user preferences, learned preferences, direction of travel and/or other contextual information, to identify locations likely to be of interest to the user (i.e. points of interest), and automatically present to the user information about such points of interest. For instance, the system can automatically present information related to fast food restaurants that are located at upcoming rest stops and that offer the user's preferred cuisine. The information can include directions to the restaurants, respective distances from a present location, specials currently being offered, and so on.

Figure 1:
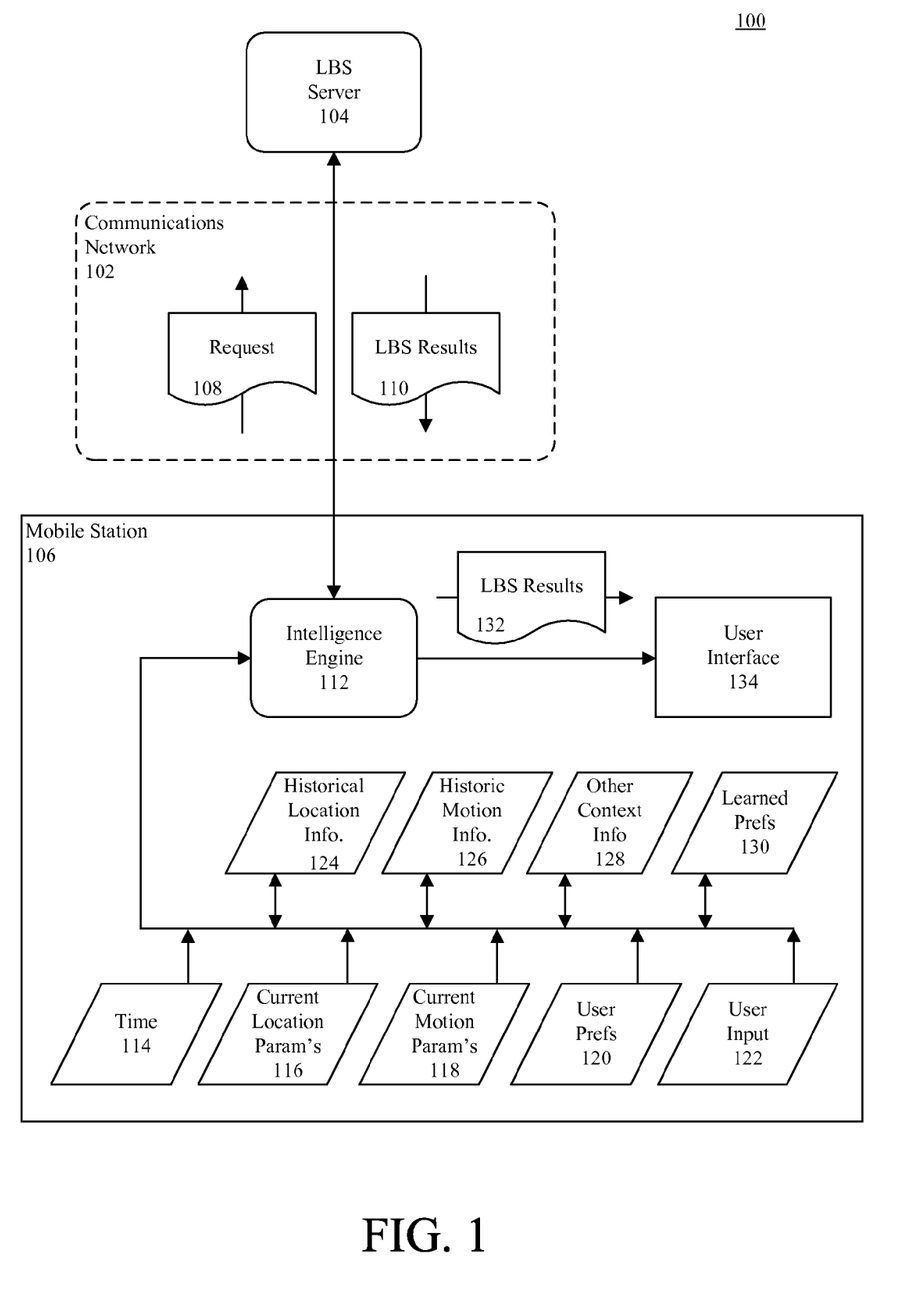
FIG. 1 depicts a communications system that is useful for understanding the present invention.

FIG. 1 depicts a communications system 100 that is useful for understanding the present invention. The communications system 100 can include a communications network 102 through which a mobile station 106 communicates with a location-based services server 104. The communications network 102 can comprise the Internet, the World Wide Web, a wide area network (WAN), a local area network (LAN), a cellular communications network, a dispatch communications network, an interconnect communications network, a public switched telephone network (PSTN), and/or any other networks or systems over which communication signals can be propagated. In that regard, the communications network 102 can include wired and/or wireless communication links.

The location-based services server 104 can be implemented as an application instantiated on a suitable processing device, for example on a web server, a network server, at a mobile switching center (MSC), on a base station controller (BSC), or on any other suitable node of the communications network 102. The location-based services server 104 can receive from the mobile station 106 requests 108 for location-based information. The requests 108 can be intelligently formulated by the mobile station 106 based on current and historical information, as well as user inputs and/or user preferences, to solicit location-based services results 110 that are of most interest to a user.

The location-based services server 104 can communicate the location-based services results 110 in response to the requests 108. The location-based services results 110 can include information which identifies points of interest, for instance businesses, services, parks, recreational areas, or any other places or services that may be of interest to a user. The location-based services results 110 also can include directions to one or more of the identified points of interest. Further information about the points of interest 110 also can be included in the location-based services results 110. Such further information can comprise indicators of products or services offered, special offers that may be available, or any other related information that may be of interest to a user.

The mobile station 106 can be a mobile telephone, a mobile radio, a personal digital assistant, a mobile computer, a portable gaming device, a portable audio and/or video player, or any other wireless communication device that may communicate with the location-based services server 104 via the communications network 102. In that regard, the mobile station 106 can be a handheld device, a device which is carried on a person, a device which is carried by or in a transportation device, such as a vehicle, or can be implemented in any other manner that enables the mobile station 106 to communicate with the location-based services server 104 from any of a plurality of locations.

An intelligence engine 112 can be instantiated on the mobile station 106. In operation, the intelligence engine 112 can receive measured parameters, for instance time 114, current location parameters 116, current motion parameters 118, and other information, such as user preferences 120 and other user inputs 122. The intelligence engine 112 can process the measured parameters 114-118 and other information 120-122 to identify one or more user patterns. For instance, while the mobile station 106 is activated, the intelligence engine 112 can associate the current location parameters 116 with the current time 114 and store such associations as historical location information 124. The historical location information 124 can include data pertaining to specific locations, for instance specific businesses, restaurants, parks, recreational areas, roads, highways, public transportation routes, and the like. The current time 114 can be a particular time of day, a particular day of a week, a particular day of a month, a particular day of a year, or any other suitable time reference. The historical location information 124 also can include a number of times a particular location is visited and/or a frequency of such visits.

Similarly, the intelligence engine 112 can associate the current motion parameters 118 with the current time 114 and store such associations as historical motion information 126. In one arrangement, the historical motion information 126 can indicate a particular mode of transportation used by the user. For instance, the historical information 126 can indicate whether the motion likely correlates to use of a bicycle, a vehicle, a marine craft, an aircraft, public transportation, or whether the motion likely correlates to walking. Further, the historical information 126 also can include a number of times a particular motion is detected and/or a frequency of such motion.

Further, other contextual information 128 can be identified by the intelligence engine 112 and stored. The other contextual information 128 can include, for example, data detected using near field communications (NFC) or a proximity sensor. Such data can indicate information about a user's location that may not be available from other types of positioning systems, such as a global positioning system (GPS). For example a near field communications sensor can receive data that indicates a user is traveling on a particular subway or on a particular bus route. Such information can be processed to identify stops along the subway or bus route. Another example of contextual information 128 can include information pertaining to a user's schedule or calendar. Such information can be processed to determine an amount of time available to the user, for instance an amount of time available for lunch.

In addition, the intelligence engine 112 can receive the user preferences 120 and associate such user preferences with the time 114, current location information 116 and/or current motion information 118, and store such associations as learned preferences 130. For example, a movie theater of choice, a cuisine of choice at a certain time of day, or a preferred driving route on a certain day of the week can be stored as learned preferences 130.

Storage of the information 124-128 and learned preferences 130 can be initiated in any suitable manner. For instance, the storage of the information 124-128 and learned preferences 130 can be initiated in response to the user requesting location-based services, in response to a user input 122, or in response to a detected parameter 114-118 that corresponds to the user preferences 120.

In addition to being used to generate the information 124-128 and learned preferences 130, the parameters 114-118 can be monitored and compared to the historical location information 124, historical motion information 126, other contextual information 128 and/or learned preferences 130. Based on such comparisons, the intelligence engine 112 can determine whether the parameters 114-118 correspond to the information 124-128 and/or learned preferences 130 (i.e. whether the parameters 114-118 correspond to an identified user pattern). For example, assume that the time, current location and current motion parameters 114-118 indicate that the mobile station 106 is traveling at a particular speed, at a particular location (e.g. a road, highway, railway, etc.) and at a particular time of day. In this case, the historical information 124-126 can be processed to identify whether there are past instances of such travel.

In response to detecting that at least one or more of the parameters 114-118 do indeed correspond to the information 124-128 and/or learned preferences 130, the intelligence engine 112 can process the corresponding information 124-128 and/or learned preferences 130 to identify location-based information likely to be of most interest to the user. For example, assume that the information 124-128 indicates that a majority of the time when the user travels in a particular manner (e.g. at the particular location at approximately the same speed and around the same time of day), the user exits the highway and proceeds to a particular rest stop. When such travel is again detected, the intelligence engine 112 can anticipate the user may wish to again proceed to the rest stop. The intelligence engine 112 then can communicate the request 108 to the location-based services server 104 to request current information associated with the rest stop. The location-based services server 104 can provide such information in the message containing the location-based services results 110. As noted, such information can include specials being offered at the rest stop, average wait time for service, fuel prices, or other information the user may be interested in.

In another example, if learned user preferences 130 indicate that the user typically eats lunch at approximately the current time 114 and that the user prefers a certain type of cuisine, and the other contextual information 128 indicates that the user has an appointment in forty-five minutes, the intelligence engine 112 can suggest fast food restaurants that serve the user's preferred cuisine and which are located along the user's route of travel. For instance, if the user is riding a subway train and prefers Asian cuisine, the intelligence engine 112 can identify fast food restaurants at or near the next subway station that serve Asian cuisine.

The location-based services results 110 can be compared to the user preferences 120, the learned preferences 130 and/or the other contextual information 128 to identify within the location-based services results 110 the information 132 that most closely correlates to the identified user pattern of the user. For instance, continuing the previous example, if more than one restaurant is identified, but the user preferences 120 indicate that he prefers restaurants that do not add MSG to their food, the location-based services results 110 can be filtered to identify only those restaurants that indicate they do not use MSG. Thus, the location-based services results 132 can be narrowly tailored to the user's present circumstances and preferences. The location-based services results 132 can be communicated to a user interface 134 for presentation to the user. The results 132 can be presented audibly, visually, or in any other suitable manner.

Further, the intelligence engine 112 can receive additional user inputs 122 from the user to broaden, narrow or change the location-based services search results 132 that are presented. For instance, the user inputs 122 can be processed to enable the user to peruse a portion of the location-based services results 110 that may have been originally filtered out by the intelligence engine 112 and/or to generate a second request based, at least in part, on the user input 122.

Figure 2:
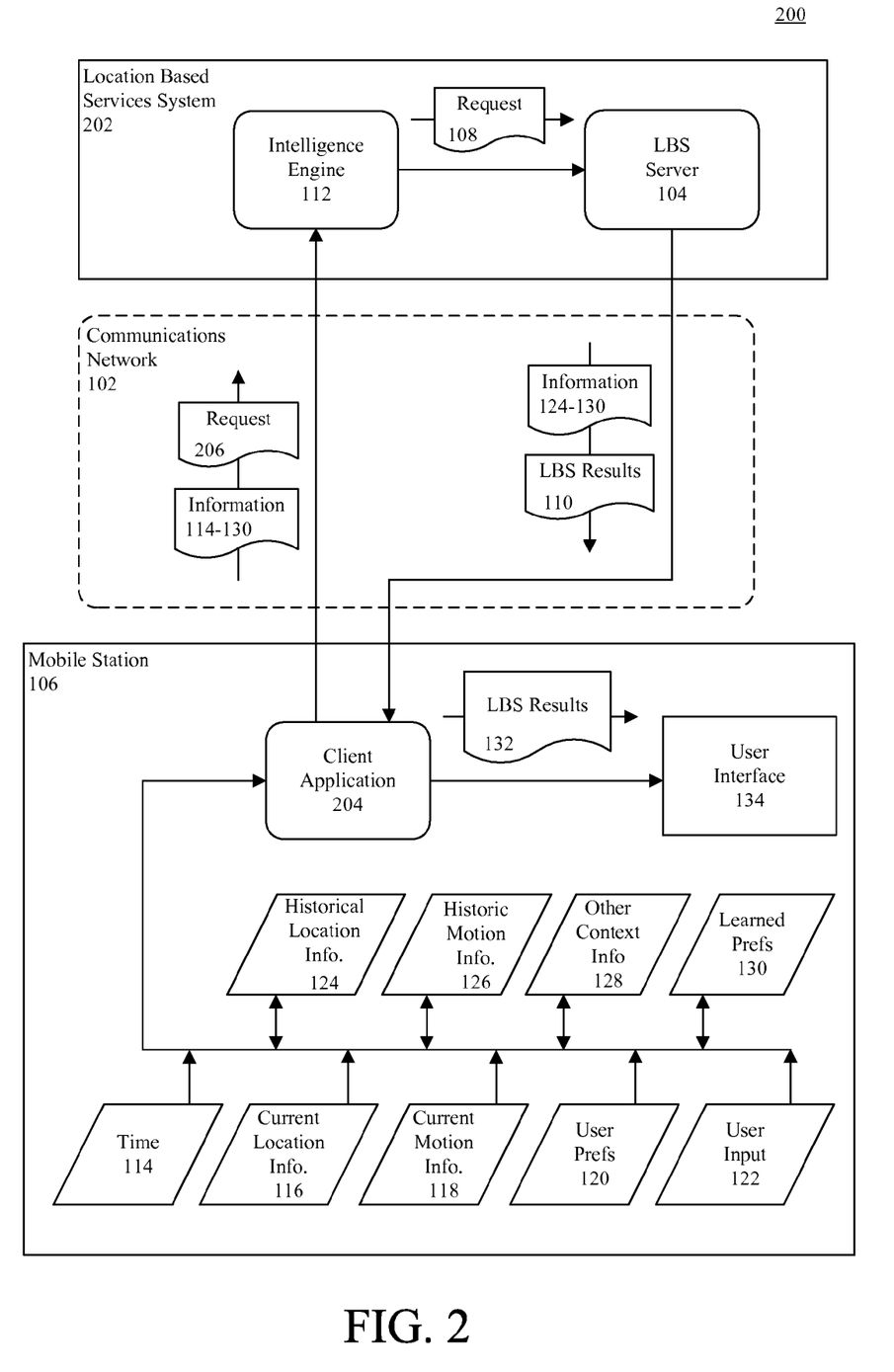
FIG. 2 depicts another communications system that is useful for understanding the present invention.

FIG. 2 depicts another communications system 200 that is useful for understanding the present invention. As with the communications system 100, the communications system 200 also can include the communications network 102, the location-based services server 104 and mobile station 106. However, in lieu of the intelligence engine 112 being instantiated on the mobile station 106, in the communications system 200 the intelligence engine 112 can be instantiated on a location-based service system 202. The location-based services server 104 also can be instantiated on the location-based services system 202. The location-based services system 202 can comprise one or more processing systems. Such processing systems can include, for example a web server, a network server, a mobile switching center (MSC), a base station controller (BSC), or on any other suitable node of the communications network 102.

In such an arrangement, the mobile station 106 can include a client application 204. In one arrangement the client application 204 can process the time 114, current location information 116, current motion information 118, user preferences 120 and user inputs 122 in order to generate the historical location information 124, the historical motion information 126, the other contextual information 128 and the learned preferences 130. Such processing can be performed as previously described in FIG. 1.

In another arrangement, the client application 204 can forward the information 114-130 to the intelligence engine 112 and the intelligence engine 112 can process the information 114-130 to generate updates to the historical location information 124, the historical motion information 126, the other contextual information 128 and the learned preferences 130. The intelligence engine 112 then can forward the updated information 124-130 to the location-based server 104, which can communicate the updated information 124-130 to the client application 204 for storage on the mobile station 106. Alternatively, the intelligence engine 112 can store the updated information 124-130 at the location-based services system 202.

Regardless of which system component generates the updates to the historical location information 124, the historical motion information 126, the other contextual information 128 and the learned preferences 130, or where such information 124-130 is stored, the client application 204 can communicate a request 206 for location-based services to the intelligence engine 112. If the updated information 124-130 is stored on the mobile station 106, the request 206 can include any applicable information selected from among all available information 114-130. If, however, the updated information 124-130 is stored at the location-based services system 202, the request 206 need only include applicable information selected from among the time 114, current location information 116, current motion information 118, user preferences 120 and user inputs 122 in order to generate the information 124-130.

The intelligence engine 112 can process the request 206 to generate the request 108 previously described with respect to FIG. 1 so as to solicit location-based services results 110 that are of interest to the user. The location-based services results 110 can be processed by the client application 204 to generate location-based services results 132 that are presented via the user interface 134.

Figure 3:
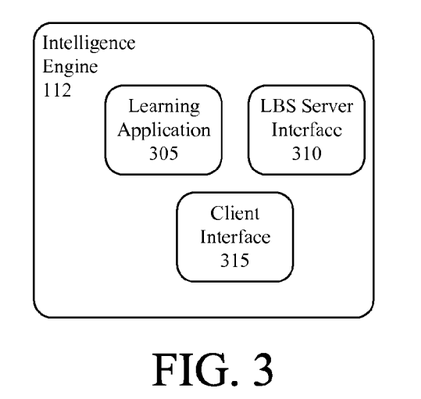
FIG. 3 depicts a block diagram of an intelligence engine that is useful for understanding the present invention.

FIG. 3 depicts a block diagram of the intelligence engine 112 that is useful for understanding the present invention. The intelligence engine 112 can comprise a learning application 305, a location-based services server interface 310 and a client interface 315. The learning application 305 can process the time, current location parameters, current motion parameters, other contextual information, user preferences and user inputs to generate the historical location and motion information and the learned preferences. Such information can be stored in a database, a hash table, or any other suitable data file. The information can be received from various mobile station components, for instance a clock, one or more sensors, one or more receivers and/or one or more transceivers on the mobile station. In an arrangement in which the intelligence engine 112 is located at the location-based services system, at least some of the information can be communicated from the mobile station to the intelligence engine 112, as will be described herein.

The location-based services server interface 310 can communicate with the location-based services server. In particular, the location-based services server interface 310 can send the requests to, and receive responses from, the location-based services server. Finally, the client interface 315 can receive user inputs and present results to the client via the user interface.

Figure 4:
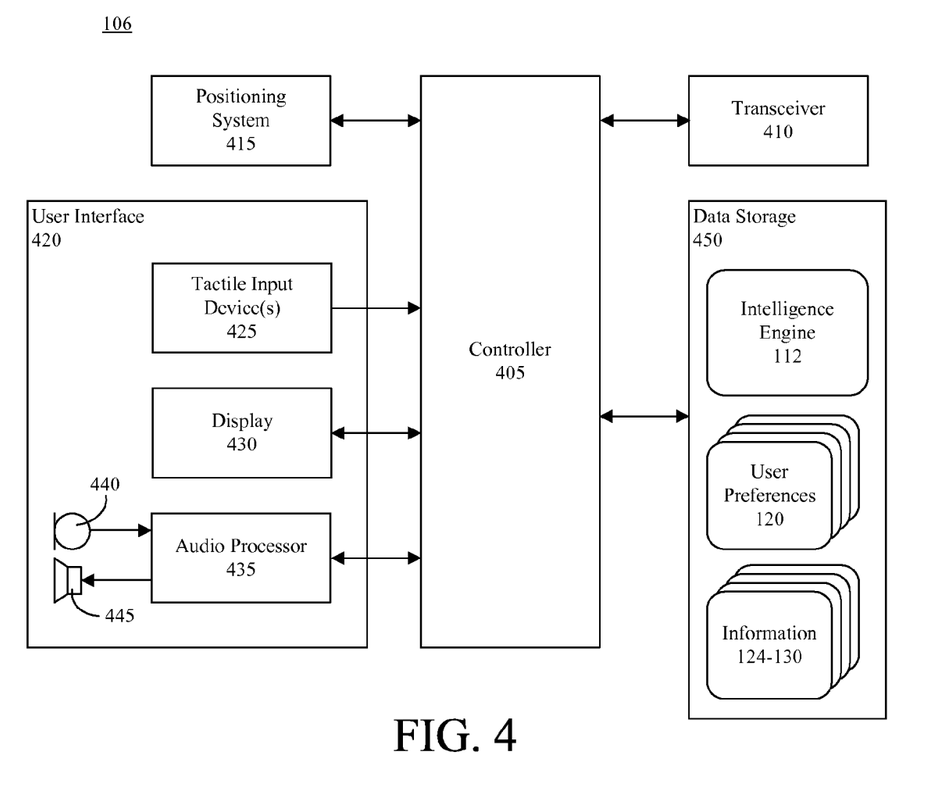
FIG. 4 depicts a block diagram of a mobile station that is useful for understanding the present invention.

FIG. 4 depicts a block diagram of an example of the mobile station 106 that is useful for understanding the present invention. The mobile station 106 can include a controller 405. The controller 405 can comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The mobile station 106 also can include a transceiver 410. The transceiver 410 can modulate and demodulate signals to convert signals from one form to another, and can transmit and/or receive such signals over one or more various wireless communication networks. In illustration, the transceiver 410 can be configured to communicate data via IEEE 802 wireless communications, for example, 802.11 and 802.16 (WiMax), WPA, or WPA2. In another example, the transceiver 410 can communicate data via GSM, TDMA, CDMA, WCDMA, OFDM, or direct wireless communication. Further, the transceiver 410 also can be configured to communicate over a wireless communication link using any of a myriad of communications protocols, for example, TCP/IP. In operation, the transceiver can transmit requests generated by the mobile station and receive responses from the location-based services server.

The mobile station can include a positioning system 415. The positioning system 415 can include, for example, a global positioning satellite (GPS) receiver. The positioning system 415 can detect current location parameters for the mobile station 106 as well as motion parameters using methods known to the skilled artisan. In lieu of, or in addition to, the positioning system 415, the mobile station 106 can receive positioning and motion parameters from the communications network. For instance, such parameters can be estimated using communication towers to implement radiolocation and/or trilateration. Radiolocation and trilateration also are known to the skilled artisan.

The mobile station 106 also can include a user interface 420 comprising one or more tactile input devices 425 and a display 430. The tactile input devices 425 can comprise one or more buttons, keys, soft keys, sensors, or any other devices suitable for receiving a tactile user input. The display 430 can be a liquid crystal display (LCD), a liquid crystal on silicon (LCOS) display, a cathode ray tube (CRT), a plasma display, or any other suitable display. In one arrangement, the display 430 can comprise a touch screen that can receive tactile and/or stylus inputs and communicate such inputs to the controller 405. The tactile input devices 425 and/or display 430 can receive user inputs to establish user preferences, receive user selections, or perform any other suitable electronic device functions.

The user interface 420 further can include an audio processor 435 connected to an input audio transducer 440 (e.g. microphone) and an output audio transducer 445 (e.g. loudspeaker). The audio processor 435 can be integrated with the controller 405 or provided as a separate component that is communicatively linked to the controller 405. The audio processor 435 can comprise a CPU, a DSP, an ASIC, a PLD, a plurality of discrete components that cooperate to process audio data, and/or any other suitable audio processing device.

The audio processor 435 can receive output audio signals from the controller 405 and communicate such signals to the output audio transducer 445. Similarly, the audio processor 435 can receive input audio signals from the input audio transducer 440 and communicate such signals to the controller 405. In one arrangement, speech recognition can be implemented to process such signals. For example, the controller 405 can execute a speech recognition application to process audio signals containing user inputs that are received from the user.

Further, additional devices (not shown) can be components of the user interface 420. For instance, the user interface 420 also can include a headset, a speakerphone, or other device(s) communicatively linked to the mobile station 106 via the transceiver 410, a second transceiver, and/or the communications port.

The mobile station 106 further can include data storage 450. The data storage 450 can include one or more storage devices, each of which can include, but is not limited to, a magnetic storage medium, an electronic storage medium, an optical storage medium, a magneto-optical storage medium, and/or any other storage medium suitable for storing digital information. In one arrangement, the data storage 450 can be integrated into the controller 405, though this need not be the case.

The intelligence engine 112, user preferences 120, historical location information 124, historical motion information 126, other contextual information 128 and learned preferences 130 can be contained on the data storage 450. The controller 405 can execute the intelligence engine 112 to implement the processes and methods described herein which are allocated to the intelligence engine 112. For example, at runtime, the intelligence engine 112 can automatically identify user patterns, store historical information corresponding to the user patterns, process the historical information to retrieve location-based service information that corresponds to one or more identified user patterns, and so on. As noted, in an alternate arrangement the intelligence engine 112 can be instantiated at a location-based services system.

Figure 5:
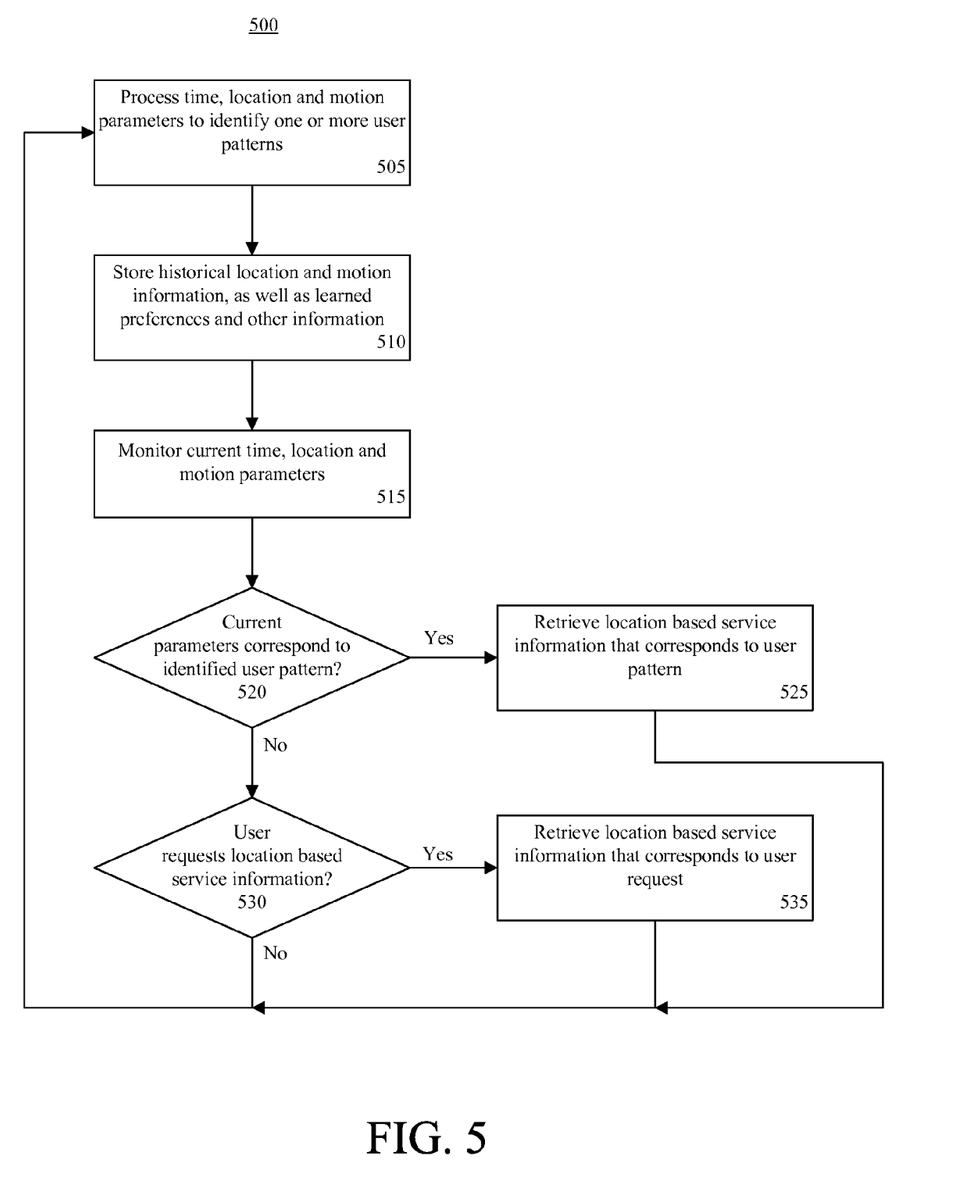
FIG. 5 is a flowchart that is useful for understanding the present invention.

FIG. 5 is a flowchart presenting a method 500 that is useful for understanding the present invention. The method 500 can begin in a state in which the mobile station 106 is monitoring current time, location and motion parameters. Beginning at step 505, the time, location and motion parameters can be processed to identify one or more user patterns. For example, a location visited by the user can be identified. Further, a location visited by a user more than once can be identified. Whether the location was visited more than once at a particular time of day, on a particular day of the week, on a particular day of the month, or on a particular day of the year also can be identified.

Motion parameters associated with the user also can be identified. In one arrangement, the motion parameters and/or the location parameters can be processed to identify a particular mode of transportation used by the user, and such information can be associated with a user pattern. For example, whether the user is traveling in a motor vehicle, a public train, or whether the user is walking can be identified. Still, any other information relevant to a user's location or motion can be identified and the invention is not limited in this regard.

Proceeding to step 510, historical information that corresponds to the identified user pattern can be stored. For instance, historical location information, historical motion information and other contextual information can be stored. In addition, specific user preferences can be learned, for example by analyzing user preference settings and user inputs, and such learned preferences also can be stored.

At step 515 current time, location and motion parameters can be monitored to detect one or more of the parameters that correspond to an identified user pattern. Referring to decision box 520, if one or more of the current parameters are detected that correspond to an identified user pattern, at step 525 location-based service information that corresponds to the identified user pattern can be retrieved, for example from a location-based service server.

If current parameters that correspond to a known user pattern are not detected, the process can proceed to decision box 530. At decision box 530, if a user requests location-based service information, the process can proceed to step 535 and location-based service information that corresponds to the user request can be retrieved from the location-based services server. The process can return to step 505 and continue unless deactivated or the mobile station is turned off.

Figure 6:
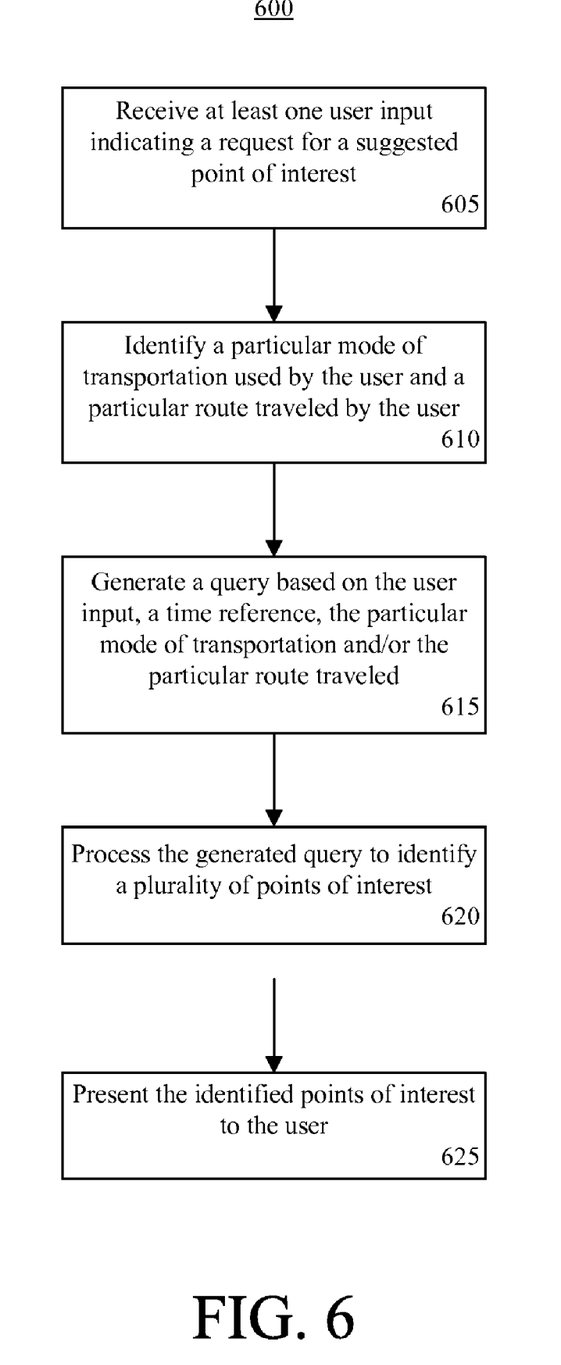
FIG. 6 is another flowchart that is useful for understanding the present invention.

FIG. 6 is another flowchart presenting a method 600 that is useful for understanding the present invention. At step 605, at least one user input can be received indicating a request for a suggested point of interest. At step 610, a particular mode of transportation used by the user and a particular route traveled by the user can be identified. For example, if the user is traveling by bus, the fact that he is traveling by bus and the bus route can be identified. If the user is traveling on a subway train, the fact that he is traveling by subway train and the subway route can be identified. If the user is traveling in a vehicle, the fact that he is traveling by vehicle road on which the user is traveling can be identified. Still, any other mode of transportation and any other routes can be identified and the invention is not limited in this regard.

Proceeding to step 615, a query can be generated based on the user input, a time reference (e.g. time of day, day of the week, day of the month, day of the year, etc.), the particular mode of transportation and/or the route traveled. At step 620 the query can be processed to identify a point of interest. For example, if the user is traveling by subway train and the user input requested information on restaurants, the intelligence engine previously described can identify restaurants located at, or proximate to, upcoming subway stations. Moreover, the time of day and other information can be processed to select restaurants likely to be of greatest interest to the user, as previously described. At step 625 the identified points of interest can be presented to the user.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

This invention can be embodied in other forms without departing from the spirit or essential attributes thereof. Accordingly, reference should be made to the following claims, rather than to the foregoing specification, as indicating the scope of the invention.

What is claimed is:

1. A method for dynamically providing location-based services, comprising:

automatically identifying, by a controller, at least one user pattern of a user, wherein identifying the at least one user pattern comprises identifying a particular route traveled by the user;

storing, by the controller, historical information that corresponds to the user pattern; and responsive to detecting at least one parameter that corresponds to the historical information, processing, by the controller, the historical information to retrieve location-based service information that corresponds to the identified user pattern, wherein detecting the parameter that corresponds to the historical information comprises detecting that the user is currently traveling along the particular route traveled before at least once by the user.

2. The method of claim 1, wherein identifying the user pattern further comprises identifying a location visited by the user along the particular route at a particular time.

3. The method of claim 2, wherein detecting the parameter that corresponds to the historical information further comprises detecting that the user is currently at the identified location along the particular route traveled before at least once by the user.

4. The method of claim 1, wherein identifying the user pattern further comprises identifying a location visited by the user along the particular route more than once at a particular time of day, on a particular day of a week, on a particular day of a month, or on a particular day of a year.

5. The method of claim 4, wherein detecting the parameter that corresponds to the historical information further comprises detecting the particular time of day, the particular day of the week, the particular day of the month, or the particular day of the year.

6. The method of claim 1, wherein:
identifying the user pattern further comprises identifying a motion parameter associated with the user along the particular route; and
detecting the parameter that corresponds to the historical information further comprises detecting the motion parameter currently associated with the user along the particular route traveled before at least once by the user.

7. The method of claim 1, wherein:
identifying the user pattern further comprises identifying a particular mode of transportation used by the user along the particular route; and
detecting the parameter that corresponds to the historical information further comprises detecting that the user is currently using the particular mode of transportation along the particular route traveled before at least once by the user.

8. The method of claim 1, further comprising processing at least one user preference to retrieve the location-based service information that corresponds to the identified user pattern.

9. A system that dynamically provides location-based services, comprising:
a controller that automatically identifies at least one user pattern of a user by identifying a particular route traveled by the user, stores historical information that corresponds to the user pattern and, responsive to detecting at least one parameter that corresponds to the historical information by detecting that the user is currently traveling along the particular route traveled before at least once by the user, processes the historical information to retrieve location-based service information that corresponds to the identified user pattern.

10. The system of claim 9, wherein the controller identifies the user pattern by identifying a location visited by the user along the particular route at a particular time.

11. The system of claim 9, wherein the controller detects the parameter that corresponds to the historical information by detecting that the user is currently at the identified location along the particular route traveled before at least once by the user.

12. The system of claim 9, wherein the controller identifies the user pattern by identifying a location visited by the user along the particular route more than once at a particular time of day, on a particular day of a week, on a particular day of a month, or on a particular day of a year.

13. The system of claim 12, wherein the controller detects the parameter that corresponds to the historical information by detecting the particular time of day, the particular day of the week, the particular day of the month, or the particular day of the year.

14. The system of claim 9, wherein the controller identifies the user pattern by identifying a motion parameter associated with the user along the particular route.

15. The system of claim 14, wherein the controller detects the parameter that corresponds to the historical information by detecting the motion parameter currently associated with the user along the particular route traveled before at least once by the user.

16. The system of claim 9, wherein the controller identifies the user pattern by identifying a particular mode of transportation used by the user along the particular route.

* * * * *